(12) United States Patent
He et al.

(10) Patent No.: US 11,410,422 B2
(45) Date of Patent: Aug. 9, 2022

(54) METHOD AND APPARATUS FOR GROUNDING A TARGET VIDEO CLIP IN A VIDEO

(71) Applicant: Beijing Baidu Netcom Science and Technology Co., Ltd., Beijing (CN)

(72) Inventors: Dongliang He, Beijing (CN); Xiang Zhao, Beijing (CN); Jizhou Huang, Beijing (CN); Fu Li, Beijing (CN); Xiao Liu, Beijing (CN); Shilei Wen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 167 days.

(21) Appl. No.: 16/905,482

(22) Filed: Jun. 18, 2020

(65) Prior Publication Data

US 2020/0320303 A1    Oct. 8, 2020

Related U.S. Application Data

(63) Continuation of application No. PCT/CN2018/119363, filed on Dec. 5, 2018.

(51) Int. Cl.
*G06V 20/40* (2022.01)
*G06N 3/00* (2006.01)
(Continued)

(52) U.S. Cl.
CPC .......... *G06V 20/41* (2022.01); *G06F 16/7837* (2019.01); *G06F 16/7844* (2019.01); *G06F 16/7847* (2019.01); *G06N 3/084* (2013.01)

(58) Field of Classification Search
CPC ........ G06V 20/41; G06V 10/40; G06V 20/00; G06F 16/7837; G06F 16/7844;
(Continued)

(56) References Cited

U.S. PATENT DOCUMENTS

2016/0014480 A1* 1/2016 Maze ................. H04N 21/4728
  725/116
2016/0335499 A1* 11/2016 Tsai ....................... G06K 9/627
2016/0358036 A1   12/2016 Yang

FOREIGN PATENT DOCUMENTS

CN    102750339 A    10/2012
CN    108304506 A    7/2018
(Continued)

*Primary Examiner* — Asghar H Bilgrami
(74) *Attorney, Agent, or Firm* — Nixon Peabody LLP

(57) ABSTRACT

A method and an apparatus for grounding a target video clip in a video are provided. The method includes: determining a current video clip in the video based on a current position; acquiring descriptive information indicative of a pre-generated target video clip descriptive feature, and executing a target video clip determining step which includes: determining current state information of the current video clip, wherein the current state information includes information indicative of a feature of the current video clip; generating a current action policy based on the descriptive information and the current state information, the current action policy being indicative of a position change of the current video clip in the video; the method further comprises: in response to reaching a preset condition, using a video clip resulting from executing the current action policy on the current video clip as the target video clip.

20 Claims, 10 Drawing Sheets

(51) Int. Cl.
*G06V 10/40* (2022.01)
*G06F 16/783* (2019.01)
*G06N 3/08* (2006.01)
*G06N 3/04* (2006.01)
*G06F 16/00* (2019.01)
*G06K 9/62* (2022.01)

(58) Field of Classification Search
CPC ..... G06F 16/7847; G06F 16/00; G06N 3/084; G06N 3/0454; G06N 3/006; G06N 3/0445; G06N 3/04; G06N 3/082; G06K 9/62
See application file for complete search history.

(56) References Cited

FOREIGN PATENT DOCUMENTS

| | | | |
|---|---|---|---|
| CN | 108647255 | A | 10/2018 |
| CN | 108932304 | A | 12/2018 |
| KR | 20150097723 | A | 8/2015 |
| KR | 20170133618 | A | 12/2016 |
| KR | 20170128771 | A | 11/2017 |
| KR | 101993001 | B1 | 6/2019 |

* cited by examiner

METHOD AND APPARATUS FOR GROUNDING A TARGET VIDEO CLIP IN A VIDEO

CROSS-REFERENCE TO RELATED APPLICATIONS

This application is a continuation of International Application No. PCT/CN2018/119363, filed on Dec. 5, 2018, the disclosure of which is hereby incorporated by reference in its entirety.

TECHNICAL FIELD

Embodiments of the present disclosure relate to the field of video processing, specifically relate to the field of video understanding, and more particularly relate to a method and an apparatus for grounding a target video clip in a video.

BACKGROUND

Video grounding refers to determining, based on a given natural language description, a video clip matching the given natural language description. A relative position of the grounded video clip in the video may be characterized, for example, by a start point and an end point of the video clip in the video.

Video grounding plays an important role in video understanding. In some existing video grounding technologies, a video clip matching a natural language description is obtained by sliding a preset slide window in the video according to a certain preset strategy.

Or, in some other existing video grounding technologies, all candidate video clip-natural language description data pairs in a pre-segmented video are exhaustively enumerated and then evaluated and ranked according to a certain evaluation indicator, and then a target video clip is chosen from among the data pairs.

SUMMARY

Embodiments of the present disclosure provide a method and an apparatus for grounding a target video clip in a video.

In a first aspect, embodiments of the present disclosure provide a method for grounding a video clip in a video, comprising: determining a current video clip in the video based on a current position; acquiring descriptive information indicative of a pre-generated target video clip descriptive feature, and executing a target video clip determining step which includes: determining current state information of the current video clip, wherein the current state information includes information indicative of a feature of the current video clip; generating a current action policy based on the descriptive information and the current state information, the current action policy being indicative of a position change of the current video clip in the video; the method further comprising: in response to reaching a preset condition, using a video clip resulting from executing the current action policy on the current video clip as the target video clip.

In some embodiments, the method further comprises: in response to failing to reach a preset condition, using a video clip resulting from executing the current action policy on the current video clip as an updated current target video clip, and re-executing the target video clip determining step.

In some embodiments, generating a current action policy based on the descriptive information and the current state information comprises: introducing the descriptive information and the current state information into a pre-trained policy generating model to thereby obtain a probabilistic distribution of executing respective action policies in a pre-generated action policy set on the current video clip; and determining the current action policy from the action policy set based on the obtained probabilistic distribution.

In some embodiments, the policy generating model includes a descriptive network and a policy generating network; the descriptive network comprises a fully-connected unit having a plurality of fully-connected layers, the fully-connected unit being configured for generating a current state based on the pre-acquired target video clip descriptive feature and the current state information; the policy generating network includes a gated recurrent unit and a first fully-connected layer, the gated recurrent unit being configured for generating a hidden state based on the current state, the first fully-connected layer being configured for generating the probabilistic distribution based on the hidden state.

In some embodiments, before executing the target video clip determining step, the method further comprises: acquiring video feature information indicative of a video feature of the video; and the descriptive network is further configured for generating the current state based on the video feature information.

In some embodiments, the current state information further includes information indicative of a relative position feature of the current video clip in the video.

In some embodiments, the method further comprises: training an initial policy generating model using an aggregate loss value obtained based on a preset loss function to thereby obtain a trained policy generating model; the aggregate loss value is determined through a determining step which includes: introducing, into the current policy generating model, the training sample video and a current video clip of the training sample video that is determined based on the current position information of the target video clip of the training sample video, and executing an iterative step which includes: determining a current state of the training sample video based on a descriptive network of the current policy generating model; introducing the current state of the determined training sample video into the policy generating network of the current policy generating model to thereby obtain a current probabilistic distribution under the current policy generating model and the current state of the training sample video; determining a loss value of the current iterative step using the preset loss function based on the determined current probabilistic distribution; using a sum of the loss value of the current iterative step and a loss value of a preceding iterative step as an updated loss value of the current iterative step; and the determining step further comprises: in response to failing to reach an iteration termination condition, updating the current position based on the current probabilistic distribution and re-executing the iterative step; in response to reaching the iteration termination condition, using the loss value of the updated current iterative step obtained from the last time of executing the iterative step as the aggregate loss value.

In some embodiments, the loss function includes a first component determined based on a preset cumulative reward function; training an initial policy generating model using an aggregate loss value obtained based on a preset loss function to thereby obtain a trained policy generating model comprises: adjusting parameters of the gated recurrent unit, the first fully-connected layer, and the fully-connected unit based on backpropagation of the aggregate loss value determined from the first component.

In some embodiments, the policy generating network further includes a second fully-connected layer; the second fully-connected layer is configured for generating a predicted reward value corresponding to the current state information based on the hidden state; the loss function further includes a second component for characterizing an offset between the predicted reward value and a ground-truth reward value determined based on the reward function; and training an initial policy generating model using an aggregate loss value obtained based on a preset loss function to thereby obtain a trained policy generating model further comprises: adjusting parameters of the second fully-connected layer based on backpropagation of the aggregate loss value determined from the first component; and adjusting parameters of the gated recurrent unit, the second fully-connected layer, and the fully-connected unit based on backpropagation of the aggregate loss value determined from the second component.

In some embodiments, the loss function further includes a third component for characterizing an entropy of a probabilistic distribution outputted by the first fully-connected layer; training an initial policy generating model using an aggregate loss value obtained based on a preset loss function to thereby obtain a trained policy generating model further comprises: adjusting parameters of the gated recurrent unit, the first fully-connected layer, and the fully-connected unit based on backpropagation of the aggregate loss value determined from the third component.

In some embodiments, the policy generating model further includes a position regression network; the position regression network includes a third fully-connected layer and a fourth fully-connected layer which are connected to the descriptive network; after determining the current state of the training sample video based on a descriptive network of the current policy generating model, the iterative step further comprises: introducing the current state of the training sample video into the third fully-connected layer to thereby obtain a predicted intersection-over-union; and introducing the current state of the training sample video into the fourth fully-connected layer to thereby obtain a predicted position of the target video clip in the training sample video; the loss function further includes a fourth component and a fifth component, wherein the fourth component is configured for characterizing an offset between the predicted intersection-over-union of the training sample video outputted by the third fully-connected layer at the current iterative step and the predicted intersection-over-union of the training sample video outputted from executing the preceding iterative step, and the fifth component is configured for characterizing an offset between a predicted position, in the training sample video, of the target video clip in the training sample video outputted by the fourth fully-connected layer and a ground-truth position of the target video clip labeled in the training sample video; training an initial policy generating model using an aggregate loss value obtained based on a preset loss function to thereby obtain a trained policy generating model further comprises: adjusting parameters of the fully-connected unit, the third fully-connected layer, and the fourth fully-connected layer based on backpropagation of the aggregate loss value determined from the fourth component and the fifth component of the loss function.

In a second aspect, embodiments of the present disclosure provide an apparatus for grounding a video clip in a video, comprising: a determining unit configured for determining a current video clip in the video based on a current position; an executing unit configured for acquiring descriptive information indicative of a pre-generated target video clip descriptive feature, and executing a target video clip determining step which includes: determining current state information of the current video clip, wherein the current state information includes information indicative of a feature of the current video clip; generating a current action policy based on the descriptive information and the current state information, the current action policy being indicative of a position change of the current video clip in the video; the apparatus further comprises: a generating unit configured for in response to reaching a preset condition, using a video clip resulting from executing the current action policy on the current video clip as the target video clip.

In some embodiments, the generating unit is further configured for: in response to failing to reach a preset condition, using a video clip resulting from executing the current action policy on the current video clip as an updated current target video clip, and re-executing the target video clip determining step.

In some embodiments, the executing unit is further configured for: introducing the descriptive information and the current state information into a pre-trained policy generating model to thereby obtain a probabilistic distribution of executing respective action policies in a pre-generated action policy set on the current video clip; and determining the current action policy from the action policy set based on the obtained probabilistic distribution.

In some embodiments, the policy generating model includes a descriptive network and a policy generating network; the descriptive network comprises a fully-connected unit having a plurality of fully-connected layers, the fully-connected unit being configured for generating a current state based on the pre-acquired target video clip descriptive feature and the current state information; the policy generating network includes a gated recurrent unit and a first fully-connected layer, the gated recurrent unit being configured for generating a hidden state based on the current state, the first fully-connected layer being configured for generating the probabilistic distribution based on the hidden state.

In some embodiments, the apparatus further comprises: an acquiring unit, wherein the acquiring unit is configured for: before the executing unit executes the target video clip determining step, acquiring video feature information indicative of a video feature of the video; and the descriptive network is further configured for generating the current state based on the video feature information.

In some embodiments, the current state information further includes information indicative of a relative position feature of the current video clip in the video.

In some embodiments, the apparatus further comprises: a training unit, wherein the training unit is configured for training an initial policy generating model using an aggregate loss value obtained based on a preset loss function to thereby obtain a trained policy generating model; the aggregate loss value is determined through a determining step which includes: introducing, into the current policy generating model, the training sample video and a current video clip of the training sample video that is determined based on the current position information of the target video clip of the training sample video, and executing an iterative step which includes: determining a current state of the training sample video based on a descriptive network of the current policy generating model; introducing the current state of the determined training sample video into the policy generating network of the current policy generating model to thereby obtain a current probabilistic distribution under the current policy generating model and the current state of the training sample video; determining a loss value of the current iterative step using the preset loss function based on the determined current probabilistic distribution; using a sum of the loss value of the current iterative step and a loss value of a preceding iterative step as an updated loss value of the current iterative step; and the determining step further comprises: in response to failing to reach an iteration termination condition, updating the current position based on the current probabilistic distribution and re-executing the iterative step; in response to reaching the iteration terminative condition, using the loss value of the updated current iterative step obtained from the last time of executing the iterative step as the aggregate loss value.

In some embodiments, the loss function includes a first component determined based on a preset cumulative reward function; the training unit is further configured for: adjusting parameters of the gated recurrent unit, the first fully-connected layer, and the fully-connected unit based on backpropagation of the aggregate loss value determined from the first component.

In some embodiments, the policy generating network further includes a second fully-connected layer; the second fully-connected layer is configured for generating a predicted reward value corresponding to the current state information based on the hidden state; the loss function further includes a second component for characterizing an offset between the predicted reward value and a ground-truth reward value determined based on the reward function; and the training unit is further configured for: adjusting parameters of the second fully-connected layer based on backpropagation of the aggregate loss value determined from the first component; and adjusting parameters of the gated recurrent unit, the second fully-connected layer, and the fully-connected unit based on backpropagation of the aggregate loss value determined from the second component.

In some embodiments, the loss function further includes a third component for characterizing an entropy of a probabilistic distribution outputted by the first fully-connected layer; the training unit is further configured for: adjusting parameters of the gated recurrent unit, the first fully-connected layer, and the fully-connected unit based on backpropagation of the aggregate loss value determined from the third component.

In some embodiments, the policy generating model includes a position regression network; the position regression network includes a third fully-connected layer and a fourth fully-connected layer which are connected to the descriptive network; the training unit, after determining a current state of the training sample video based on a descriptive network of the current policy generating model, is further configured for: introducing the current state of the training sample video into the third fully-connected layer to thereby obtain a predicted intersection-over-union; and introducing the current state of the training sample video into the fourth fully-connected layer to thereby obtain a predicted position of the target video clip in the training sample video; the loss function further includes a fourth component and a fifth component, wherein the fourth component is configured for characterizing an offset between the predicted intersection-over-union of the training sample video outputted by the third fully-connected layer at the current iterative step and the predicted intersection-over-union of the training sample video outputted from executing the preceding iterative step, and the fifth component is configured for characterizing an offset between a predicted position, in the training sample video, of the target video clip in the training sample video outputted by the fourth fully-connected layer and a ground-truth position of the target video clip labeled in the training sample video; the training unit is further configured for: adjusting parameters of the fully-connected unit, the third fully-connected layer, and the fourth fully-connected layer based on backpropagation of the aggregate loss value determined from the fourth component and the fifth component of the loss function.

In a third aspect, embodiments of the present disclosure provide an electronic device, comprising: one or more processors; a storage device configured for storing one or more programs, such that when the one or more programs are executed by the one or more processors, the one or more processors are caused to implement the method described in the first aspect.

In a fourth aspect, embodiments of the present disclosure provide a computer readable storage medium on which a computer program is stored, wherein the program, when being executed by a processor, implements the method described in the first aspect.

According to the technical solution of grounding a target video clip in a video provided according to the embodiments of the present disclosure, first, the current video clip in the video is determined based on the current position; next, the current state information is determined; and the current action policy is generated based on the current state information; and then, the current position is changed using the current action policy, thereby correspondingly changing the video clip obtained from the video. Besides, by setting a preset condition and using the video clip obtained after executing the current action policy on the current video clip as the target video clip when the preset condition is reached, it is expected to ground, from the video, the target video clip matching the preset description information.

BRIEF DESCRIPTION OF THE DRAWINGS

Other features, objectives, and advantages of the present disclosure will become more apparent through reading the detailed description of the non-limiting embodiments with reference to the drawings below.

DETAILED DESCRIPTION OF THE PREFERRED EMBODIMENTS

Figure 1:
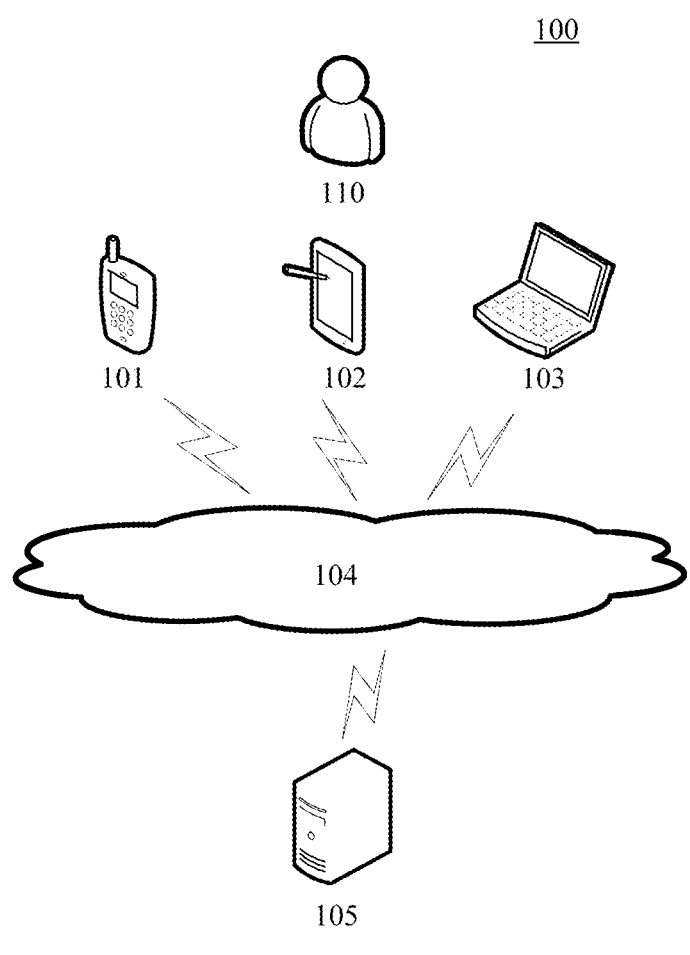
FIG. 1 is a schematic system architecture diagram in which a method for grounding a target video clip in the video according to an embodiment of the present application may be applied.

Hereinafter, the present disclosure will be described in further detail with reference to the accompanying drawings and the embodiments. It may be understood that the preferred embodiments described herein are only for illustrating the relevant invention, not for limiting the present disclosure. Additionally, it needs to be further noted that for the ease of depiction, only those parts related to the present disclosure are illustrated in the drawings.

Furthermore, it needs to be noted that without conflicts, the embodiments and the features in the embodiments of the present disclosure may be combined with each other. Hereinafter, the present disclosure will be described in detail with reference to the drawings in conjunction with the embodiments.

FIG. 1 illustrates a schematic system architecture 100 that may apply an embodiment of a method for grounding a target video clip in a video or an embodiment of an apparatus for grounding a target video clip in a video according to the present disclosure.

As shown in FIG. 1, the system 100 may comprise terminal devices 101, 102, 103, a network 104 and a server 105. The network 104 is configured as a medium for providing a communication link between the terminal devices 101, 102, 103, and the server 105. The network 104 may comprise various connection types, e.g., a wired/wireless communication link or an optical fiber cable, etc.

The user 110 may interact with the server 105 via the network 104 using the terminal device 101, 102, 103 to receive or send messages, etc. The terminal devices 101, 102, and 103 may be installed with various client applications, e.g., a video processing application, an image processing application, a search application, a life service application, and a shopping application, etc.

The terminal devices 101, 102, 103 may be various kinds of electronic devices having a display screen, including, but not limited to, a smart mobile phone, a tablet computer, a smart watch, a laptop portable computer, and a desktop computer, etc.

The server 105 may be a server that provides various services, e.g., a background server that processes a video grounding request sent from the terminal devices 101, 102, or 103. The background server may perform processing such as parsing a video, grounding a target video clip, etc. based on the received video grounding request and feeding back a processing result (e.g., information indicative of a position of the grounded target video clip in the video) to the terminal devices 101, 102, 103.

It needs to be noted that the method for grounding a target video clip in a video according to the embodiments of the present disclosure may be executed by the server 105 or by the terminal devices 101, 102, 103; or part of the method may be executed by the server 105 while the other part thereof is executed by the terminal devices 101, 102, 103. Correspondingly, an apparatus for grounding a target video clip in a video may be provided in the server 105 or provided in the terminal devices 101, 102, 103; or, part of the apparatus may be provided in the server 105 while the other part is provided in the terminal devices 101, 102, 103.

It should be understood that in the condition that the method for grounding a target video clip in a video according to the embodiments of the present disclosure is only executed by the server 105 or only by the terminal devices 101, 102, 103; the architecture shown in FIG. 1 may only comprise the server or only comprise the terminal device. Besides, the numbers of terminal devices, networks and servers in FIG. 1 are only schematic. Any numbers of terminals, networks and servers may be provided according to implementation needs. For example, the server may be a clustered server including a plurality of servers deployed with different processes.

Figure 2:
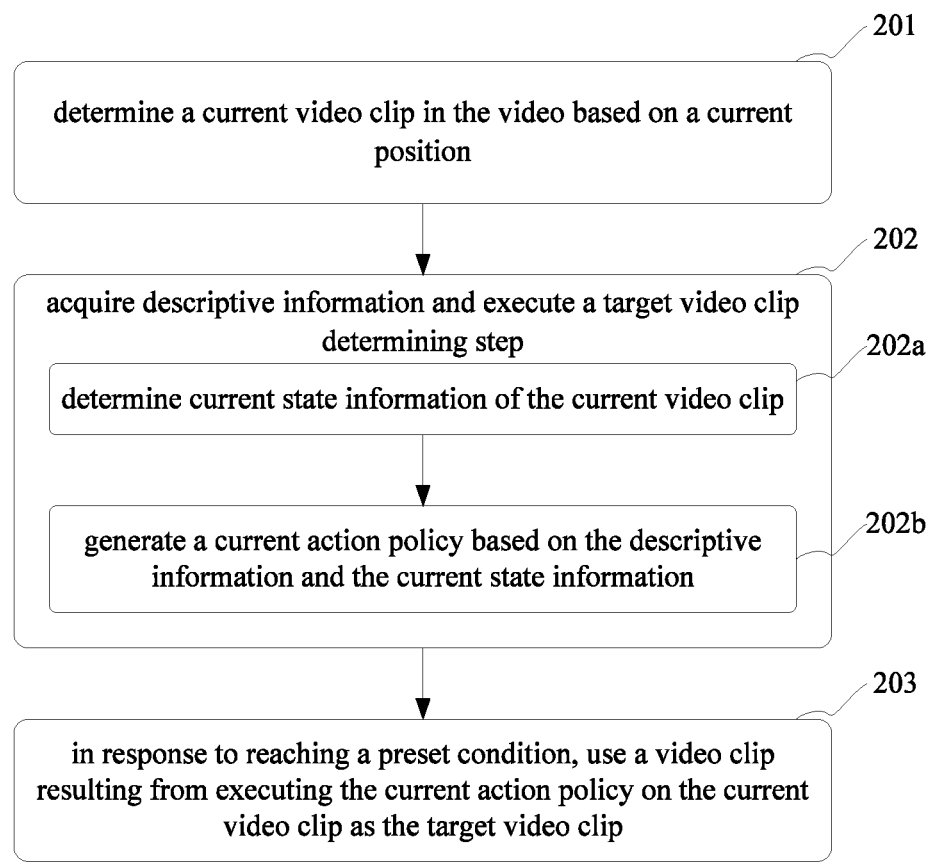
FIG. 2 is a flow diagram of an embodiment of a method for grounding a target video clip in a video according to the present disclosure.

Continue to refer to FIG. 2, which shows a flow diagram 200 of an embodiment of a method for grounding a target video clip in a video according to the present disclosure.

In the method of the embodiment, the target video clip may be understood as a video clip satisfying a certain preset requirement or condition in a given video. Correspondingly, the method for grounding a target video clip in a video in this embodiment aims to localize a video clip satisfying the preset requirement or condition in the given video.

A method for grounding a target video clip in a video comprising steps of:

Step 201: determining a current video clip in the video based on a current position.

The video here may refer to any pre-acquired video file. The video file may include a plurality of video frames arranged in a certain predetermined sequence (e.g., a sequence of capturing the video).

An executing body may adopt any feasible manner to thereby obtain the video file.

For example, in some application scenarios, the video file may be captured by the executing body using a video acquiring unit provided thereon or a video acquiring apparatus in communication therewith. For example, if the executing body is the terminal device shown in FIG. 1, the video file may be captured by a camera on the terminal device or a camera device in wired or wireless communication with the terminal device.

Or, in some other application scenarios, the video file may be stored in a memory unit of the executing body, or may also be stored in a memory unit of other electronic device in communication with the executing body, and in response to a certain trigger condition, the video file is sent to the executing body.

The video clip may refer to a clip formed by at least a part of continuous video frames in a video. For example, a video includes the $1^{st}$ to $1000^{th}$ video frames. The video clip may be a clip formed by the $1^{st}$ to the $10^{th}$ video frames among the video frames included in the video.

In some application scenarios, a position of the video clip in the video for example may be characterized by the positions of the video frames included in the video clip in the video frame sequence formed by the video frames included in the whole video. For example, the video frame sequence formed by the video frames in the video is represented as $F=[f_1, f_2, \ldots, f_{1000}]$, the video clip may be represented as $F_1=[f_{10}, f_{11}, \ldots, f_{20}]$, indicating that the video clip $F_1$ is formed by the $10^{th}$ to the $20^{th}$ video frames in the video frame sequence F.

Or, in some other application scenarios, the position of the video clip may also be characterized by a start point and an end point of the video clip in the video. For example, the total length of the video is T, and the video clip may be represented as [t1, t2], where t1 denotes the start point of the video clip in the video, while t2 denotes the end point of the video clip in the video, t1, t2 and T satisfying 0≤t1≤t2≤T.

Besides, it may be understood that the position of the video clip in the video may also be characterized using any other feasible manner. For example, it may be characterized by the start point of the video clip in the video and the length of the video clip, which will not be detailed here.

In this step, the current position may be artificially designated or may be calculated by a certain method. Moreover, in this step, it is also feasible to first determine the current position and then determine the corresponding video clip in the video based on the current position. For example, in some application scenarios, the video clip may be characterized by a start point and an end point of the video clip in the video. In such application scenarios, it is feasible to first determine the start point t1 and the end point t2 and then determine the video clip that starts from the time stamp t1 and ends at the time stamp t2 in the video.

Step 202: acquiring descriptive information indicative of a pre-generated target video clip descriptive feature, and executing a target video clip determining step.

A descriptive feature of the target video clip may be understood as a feature for describing the target video clip desired to be grounded. For example, it is desired to ground a video clip where "a driving red sedan" appears in a video; then, the descriptive feature may be a feature that may characterize the meaning of "a driving red sedan."

In some application scenarios, the descriptive feature of the target video clip may be obtained using a pretrained Sentence2vec model. In practice, the descriptive sentence of the target video clip may be segmented firstly; and word vectors corresponding to respective segmented words are obtained using a pretrained Word2vec model; then, weights of respective word vectors are determined through the Sentence2vec model; finally, a feature vector corresponding to the descriptive sentence is obtained based on the respective word vectors and their corresponding weights, the feature vector being used as the descriptive feature of the target video clip.

The target video clip determining step may further comprise the following sub-steps 202*a*~202*b*.

Sub-step 202*a*: determining current state information of the current video clip, wherein the current state information includes information indicative of a feature of the current video clip.

The feature of the current video clip for example may be a feature that may characterize an object (e.g., people and scenes appearing in the current video clip) included in the current video clip and a state of the object (e.g., the action of the people or the morphology of the scene in the current video clip). In practice, the feature of the current video clip may be extracted using a pretrained feature extraction network. For example, the feature of the current video clip may be extracted using a pretrained three-dimensional convolutional neural network; the extracted feature not only includes a spatial feature of the current video clip (i.e., the feature of each video frame in the current video clip), but also includes a temporal feature of the current video clip.

Sub-step 202*b*: generating a current action policy based on the descriptive information and the current state information, the current action policy being indicative of a position change of the current video clip in the video.

It may be derived from the description above that a position of the current video clip in the video may be characterized by the positions of the video frames included in the video clip in the video frame sequence formed by the video frames included in the whole video, or may be characterized by the start point and the end point of the video clip in the video. Therefore, a position change of the current video clip in the video may also be characterized by a position change of the current video clip in the video frame sequence, or may be characterized by a change of the start point and/or end point of the current video clip in the video.

Here, the current action policy for example may be understood as a change strategy set in one "time slide window" in the video. In this step, based on the current state information obtained in step 202*a*, a change to the time slide window may include, but not limited to, at least one action of: changing the start position of the time slide window, changing the end position of the time slide window, and changing the length of the time slide window, etc.

Besides, in some application scenarios, the current action policy may be determined based on an offset between the descriptive information and the current state information, thereby changing the video clip grounded in the video. In these application scenarios, for example, the information indicative of the pre-generated target video clip descriptive feature and the information indicative of the feature of the current video clip are both represented as feature vectors, and the position change and/or length change of the time slide window may be determined based on the respective numerical value features of the two feature vectors and the distance between the two feature vectors, thereby changing the grounded video clip from the video.

It may be understood that because the change of the time slide window changes the grounded video clip from the video; correspondingly, the feature of the grounded video clip will also change accordingly.

The method for grounding a target video clip in a video in this embodiment further comprises:

Step 203: in response to reaching a preset condition, using a video clip resulting from executing the current action policy on the current video clip as the target video clip.

Here, the preset condition may be any preset feasible condition.

For example, in some application scenarios, the number of times of executing the target clip determining step may be used as a preset condition. In these application scenarios, if the number of times of executing the target clip determining step reaches a preset number of times threshold, the time slide window may be changed using the current action policy determined by the last execution of the target clip determining step, and the video clip determined by the changed time slide window is used as the target video clip.

Or, in some other application scenarios, a certain preset target action policy may also be used as the preset condition. In these application scenarios, if the current action policy determined by the target video clip determining step is identical or highly similar to the target action policy, the video clip obtained after the last time of executing the current action policy may be used as the target video clip. In these application scenarios, for example, the target action policy is "not changing the time slide window"; if the current action policy obtained after executing the target video clip determining step is also "not changing the time slide window" or the current time slide window is only changed slightly, then the time slide window may be changed using the current action policy determined in the last execution of the target clip determining step, and the video clip determined by the changed time slide window is used as the target video clip.

According to the method for grounding a target video clip in a video provided according to the embodiments of the present disclosure, first, the current video clip in the video is determined based on the current position; next, the current state information is determined; the current action policy is generated based on the current state information; and then, the current position is changed using the current action policy, thereby correspondingly changing the video clip obtained from the video. Besides, by setting a preset condition and using the video clip obtained after executing the current action policy on the current video clip as the target video clip when the preset condition is reached, the target video clip matching the preset description information may be grounded in the video.

It may be understood that in the method for grounding a target video clip in the video in this embodiment, if the preset condition is still not satisfied after executing the target video clip determining step, a video clip resulting from executing the current action policy on the current video clip is used as an updated current target video clip, and the target video clip determining step is re-executed. In this way, before the preset condition is satisfied, the current video clip may progressively approach to the target video clip by recurrently and iteratively executing the target video clip determining step.

Figure 3:
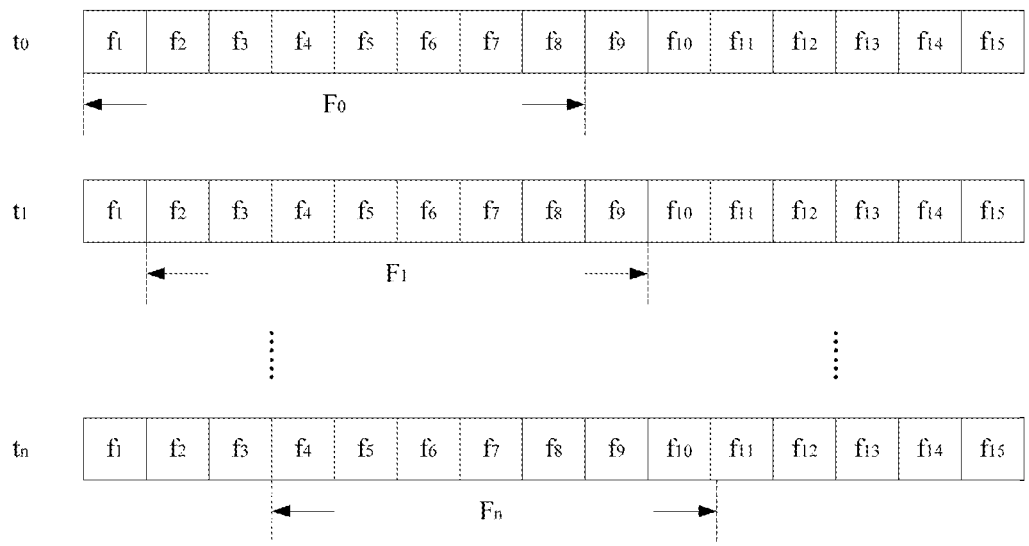
FIG. 3 is a schematic diagram of an application scenario of a method for grounding a target video clip in a video according to the present disclosure.

Continue to refer to FIG. 3, which is a schematic diagram 300 of an embodiment of an application scenario of a method for grounding a target video clip in a video according to the present disclosure. In this application scenario, for example, it is desired to ground a video clip describing a boy playing guitar in the video.

As shown in FIG. 3, first, at the time stamp to, an initial time slide window is determined in the video formed by the video frame sequence $[f_1, f_2, \ldots, f_{15}]$, and the current video clip $F_0=[f_1, f_2, \ldots, f_8]$ is determined based on the initial time slide window.

Next, a descriptive information of the feature for characterizing the descriptive sentence "a boy playing guitar" is determined. For example, a descriptive feature of the descriptive sentence may be extracted using a pretrained Sentence2vec model (e.g., a Skip-thought model), and the descriptive information is obtained based on the descriptive feature.

Next, the current state information of the current video clip $F_0$ may be determined. For example, the feature vector of the current video clip $F_0$ may be extracted by introducing $F_0$ into the pre-trained three-dimensional convolutional neural network model, and then the current state information is obtained based on the feature vector.

Next, through operations on the descriptive information and the current state information (e.g., through comparison between the descriptive information and the current state information), a current action policy may be generated, where the current action policy may adjust the current video clip $F_0$ determined by the current time slide window.

Next, if the current state does not satisfy a preset condition (e.g., the current number of times of executing the target video clip determining step does not reach a preset number of times threshold, and/or the current action policy does not match the preset action policy), the current action policy is implemented for the current video clip $F_0$, thereby obtaining a new current video clip $F_1=[f_2, f_3, \ldots, f_9]$.

Being so recurrent and iterative, if the preset condition is reached after executing n times of target video clip determining step, the current video clip $F_n=[f_4, f_5, \ldots, f_{10}]$ after executing the current action policy may be used as the grounded target video clip.

Figure 4:
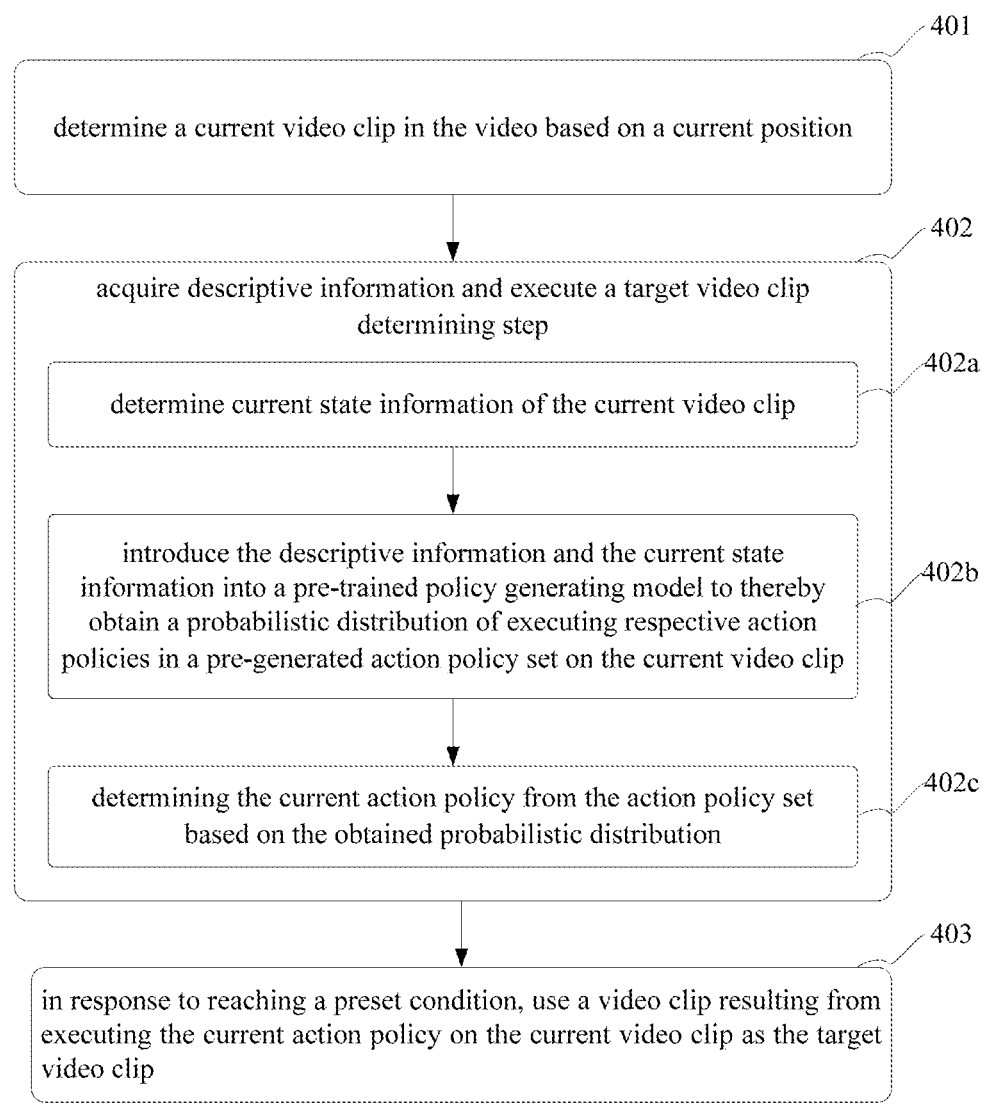
FIG. 4 is a flow diagram of another embodiment of a method for grounding a target video clip in a video according to the present disclosure.

Refer to FIG. 4, which is a schematic flow 400 of another embodiment of a method for grounding a target video clip in a video according to the present disclosure.

The method according to this embodiment comprises steps of:

Step 401: determining a current video clip in the video based on a current position.

The step 401 of this embodiment may be executed in a manner similar to step 201 of the embodiment shown in FIG. 2, which will not be detailed here.

Step 402: acquiring descriptive information indicative of a pre-generated target video clip descriptive feature, and executing a target video clip determining step.

The target video clip determining step in this embodiment may further comprise sub-steps 402a~402c.

Specifically, Sub-step 402a: determining current state information of the current video clip, wherein the current state information includes information indicative of a feature of the current video clip.

The Sub-step 402a of this embodiment may be executed in a manner similar to Sub-step 202a of the embodiment shown in FIG. 2, which will not be detailed here.

Sub-step 402b: introducing the descriptive information and the current state information into a pre-trained policy generating model to thereby obtain a probabilistic distribution of executing respective action policies in a pre-generated action policy set on the current video clip.

Here, the policy generating model for example may be obtained through reinforcement learning. The reinforcement learning refers to learning by an agent in a "try and error" manner, which guides behaviors based on the rewards obtained from interaction with the environment, a goal of which is to grant a largest reward to the agent.

Because in this embodiment the goal of learning is to thereby obtain a certain action policy and finally accurately ground a video clip corresponding to the descriptive feature in the video, it may be understood that by duly setting a reward, the agent may progressively ground the target video clip matching the descriptive feature in the video.

For example, it may be understood that causing the agent to execute more times of target video clip determining step may be favorable to the accuracy of the finally grounded target video clip, but will also significantly increase the computational cost. Therefore, during reinforcement learning, the reward may be made positively correlated with the accuracy determined based on a certain evaluation indicator and negatively correlated with the computational cost, thereby causing the finally learned strategy more accurate with a lower computational cost.

Besides, a pre-generated action policy set may include a plurality of preset action policies. For example, in some optional implementations, the action policy set may include the following preset action policies: simultaneously moving the start point and the end point of the current video clip ahead by $\delta$, simultaneously moving the start point and the end point of the current video clip backward by $\delta$, moving the start point of the current video clip ahead by $\delta$, moving the start point of the current video clip backward by $\delta$, moving the end point of the current video clip ahead by $\delta$, and moving the end point of the current video clip backward by $\delta$, and stop (namely, making no adjustment to the start point and the end point of the current video clip). Here, $\delta$ may a numerical value calculated based on a certain preset percentage and the total length of the video. For example, if the preset percentage is 10% and the total length of the video is 1 minute, then $\delta$ may be 60 seconds×10%=6 seconds.

Sub-step 402c: determining the current action policy from the action policy set based on the obtained probabilistic distribution.

Through the reinforcement learning, the probabilistic distribution of executing respective action policies in the action policy set on the current video clip may be obtained. The probabilistic distribution may be understood as a probability for each action policy in the action policy set being the currently optimal action policy. In other words, an action policy with a relatively large probability in the probabilistic distribution correspondingly has a relatively large probability of being an optimal action. Therefore, in some optional implementations, an action policy corresponding to a highest probability in the probabilistic distribution may be determined as the current action policy.

The method for grounding a target video clip in a video in this embodiment further comprises:

Step 403: in response to reaching a preset condition, using a video clip resulting from executing the current action policy on the current video clip as the target video clip.

The step 403 may also be executed in a manner similar to step 203 of the embodiment shown in FIG. 2, which will not be detailed here.

Besides, in some optional implementations, similar to the embodiment shown in FIG. 2, if the preset condition is not satisfied, in the method of this embodiment, the video clip resulting from executing the current action policy on the current video clip may also be used as an updated current target video clip, and the target video clip determining step is re-executed.

Figure 5:
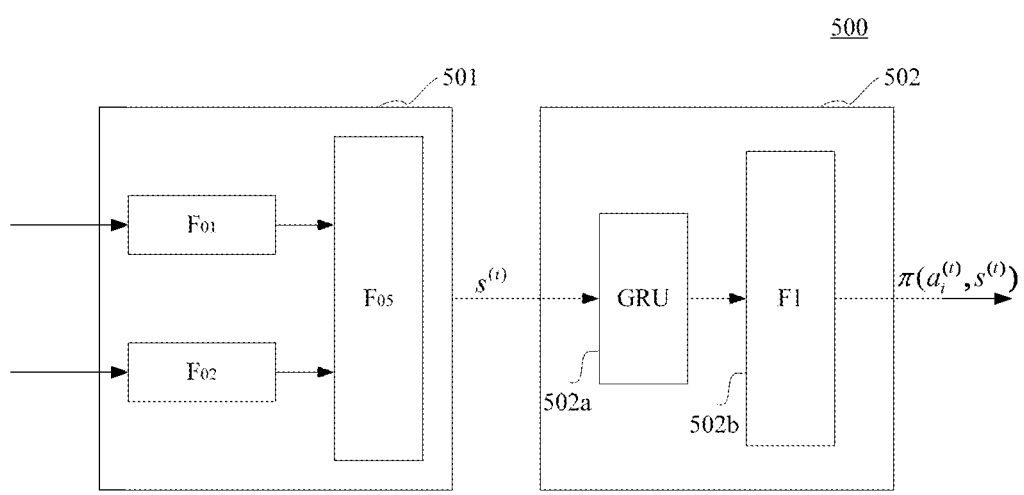
FIG. 5 is a schematic structural diagram of a policy generating model that may be applied to the embodiment of FIG. 4.

In some optional implementations, the method for grounding a target video clip in a video in this embodiment may adopt a policy generating model 500 as shown in FIG. 5.

Specifically, as shown in FIG. 5, the policy generating model may include a descriptive network 501 and a policy generating network 502.

The descriptive network 501 includes a fully-connected unit having a plurality of fully-connected layers, the fully-connected unit being configured for generating a current state $s^{(t)}$ based on the pre-acquired target video clip descriptive feature and the current state information.

For example, in some optional implementations, as shown in FIG. 5, the fully-connected unit may include fully-connected layers F01, F02, and F05. Among them, the fully-connected layer F01 may receive target video clip descriptive features, fuse the received target video clip descriptive features, and output a fused feature. Similarly, the fully-connected layer F02 may receive the current state information, e.g., information indicative of the feature of the current video clip, and output a fused feature of the received information indicative of the feature of the current video clip. The fully-connected layer F05 may further fuse the received outputs of the fully-connected layers F01 and F02, and output the fused feature, i.e., the current state $s^{(t)}$.

It may be understood that in some optional implementations, if it is desired to use more information to describe the feature of the video and the feature of the current video clip, the descriptive network may further receive these features and provide further fully-connected layers to fuse these features. Correspondingly, the fully-connected layer F05 in the fully-connected unit may also receive these fused features to thereby obtain the current state $s^{(t)}$ based on these fused features.

For example, in some application scenarios of these optional implementations, besides the information indicative of the current video clip, the current state information further includes information indicative of a relative position feature of the current video clip in the video. In such application scenarios, the descriptive network (e.g., the fully-connected unit) may further include a fully-connected layer F03 (not shown in the figure). The fully-connected layer F03 may fuse the received information indicative of the relative position feature of the current video clip in the video and output the fused information to the fully-connected layer F05 shown in FIG. 5. The fully-connected layer F05 may further fuse the received outputs of the fully-connected layers F01, F02, and F03, and output the fused feature, i.e., the current state $s^{(t)}$.

Besides, in such application scenarios, before executing the target video clip determining step, the executing body may further acquire video feature information indicative of a video feature of the video. For example, the executing body may extract the video feature of the video using a pre-trained three-dimensional convolutional neural network to thereby obtain the video feature information. Here, the video feature of the whole video may be extracted by the three-dimensional convolutional neural network that extracts the video feature of the current video clip. In such application scenarios, correspondingly, the descriptive network (e.g., the fully-connected unit) may further include a fully-connected layer F04 (not shown in the figure). The fully-connected layer F04 may fuse the received video feature information indicative of the video feature of the video and output the fused video feature information to the fully-connected layer F05 shown in FIG. 5. The fully-connected layer F05 may further fuse the received outputs of the fully-connected layers F01, F02, F03, and F04, and output the fused feature, i.e., the current state $s^{(t)}$.

The policy generating network 502 may comprise a gated recurrent unit (GRU) 502a and a first fully-connected layer 502b. The gated recurrent unit 502a is configured for generating a hidden state based on the current state information $s^{(t)}$, and the first fully-connected layer 502b may be configured for generating a probabilistic distribution $\pi(a_i^{(t)}, s^{(t)})$ based on the hidden state. Here, $\pi(a_i^{(t)}, s^{(t)})$ may be understood as the probabilistic distribution of respective action policies $a_i^{(t)}$ under the current state $s^{(t)}$. Here, the action policy $a_i^{(t)}$ refers to any action policy in a preset action policy set $\mathcal{A}$. It can be understood that, in some application scenarios, the policy generating network 502 may further comprise classifier (not shown in the figure). the classifier may be Softmax classifier. The classifier may normalize the probability distribution outputted by the first fully-connected layer 502b, so that the sum of the probability corresponding to each action policy in the normalized probability distribution is 1.

Apparently, before determining the current action policy using the policy generating model, it is further needed to train the policy generating model.

Here, an initial policy generating model may be trained using an aggregate loss value obtained based on a preset loss function to thereby obtain a trained policy generating model.

Figure 6:
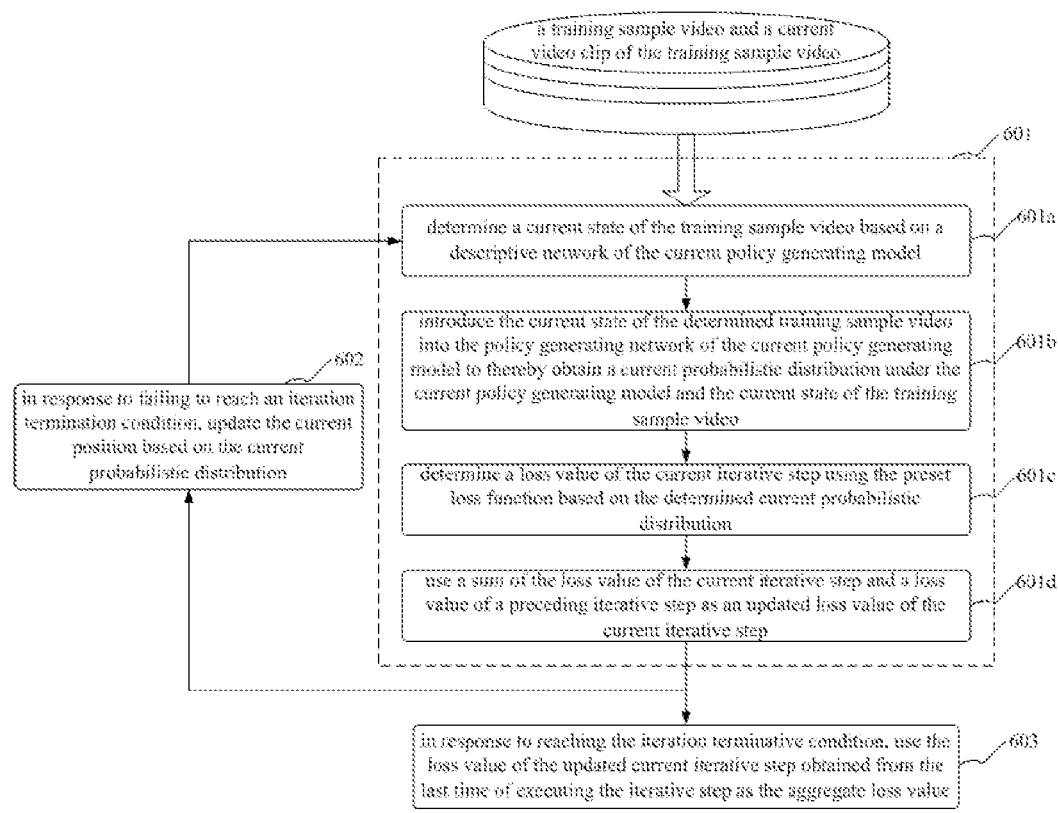
FIG. 6 is a schematic flow of determining an aggregate loss value.

In some optional implementations, the aggregate loss value may be obtained through the flow shown in FIG. 6.

Specifically, first, the training sample video and a current video clip of the training sample video that is determined based on the current position information of the target video clip of the training sample video may be introduced into the current policy generating model. And Step 601 is iteratively executed.

Specifically, the iterative step 601 may further comprise:

Sub-step 601a: determining a current state of the training sample video based on a descriptive network of the current policy generating model. Here, the current state of the training sample video for example may be obtained based on the descriptive feature of the pre-labeled target video clip in the training sample video, the current state information (e.g., information indicative of the feature of the current video clip, and information indicative of the relative position feature of the current video clip in the video) of the current video clip of the training sample video, and the video feature information of the training sample video. It can be understood that, during the training process of the policy generating model, the parameters of the policy generation model are changing. Therefore, here, the current policy generating model may be the initial policy generation model, or, the current policy generation model may be a policy generation model obtained by adjusting the parameters of the initial policy generation model one time or plural of times based on the backpropagation of the aggregate loss value.

Sub-step 601b: introducing the current state of the determined training sample video into the policy generating network of the current policy generating model to thereby obtain a current probabilistic distribution under the current policy generating model and the current state of the training sample video.

Sub-step 601c: determining a loss value of the current iterative step using the preset loss function based on the determined current probabilistic distribution.

Sub-step 601d: using a sum of the loss value of the current iterative step and a loss value of a preceding iterative step as an updated loss value of the current iterative step.

Next, step 602: in response to failing to reach an iteration termination condition, updating the current position based on the current probabilistic distribution and re-executing the iterative step 601.

Step 603: in response to reaching the iteration terminative condition, using the loss value of the updated current iterative step obtained from the last time of executing the iterative step as the aggregate loss value.

In this way, by executing the iterative step 601 and progressively updating the loss value of the current iterative step and the current position, the loss value calculated each time may be aggregated till satisfying an iterative termination condition.

Hereinafter, a manner of determining the aggregate loss value will be further illustrated with reference to FIG. 7.

Figure 7:
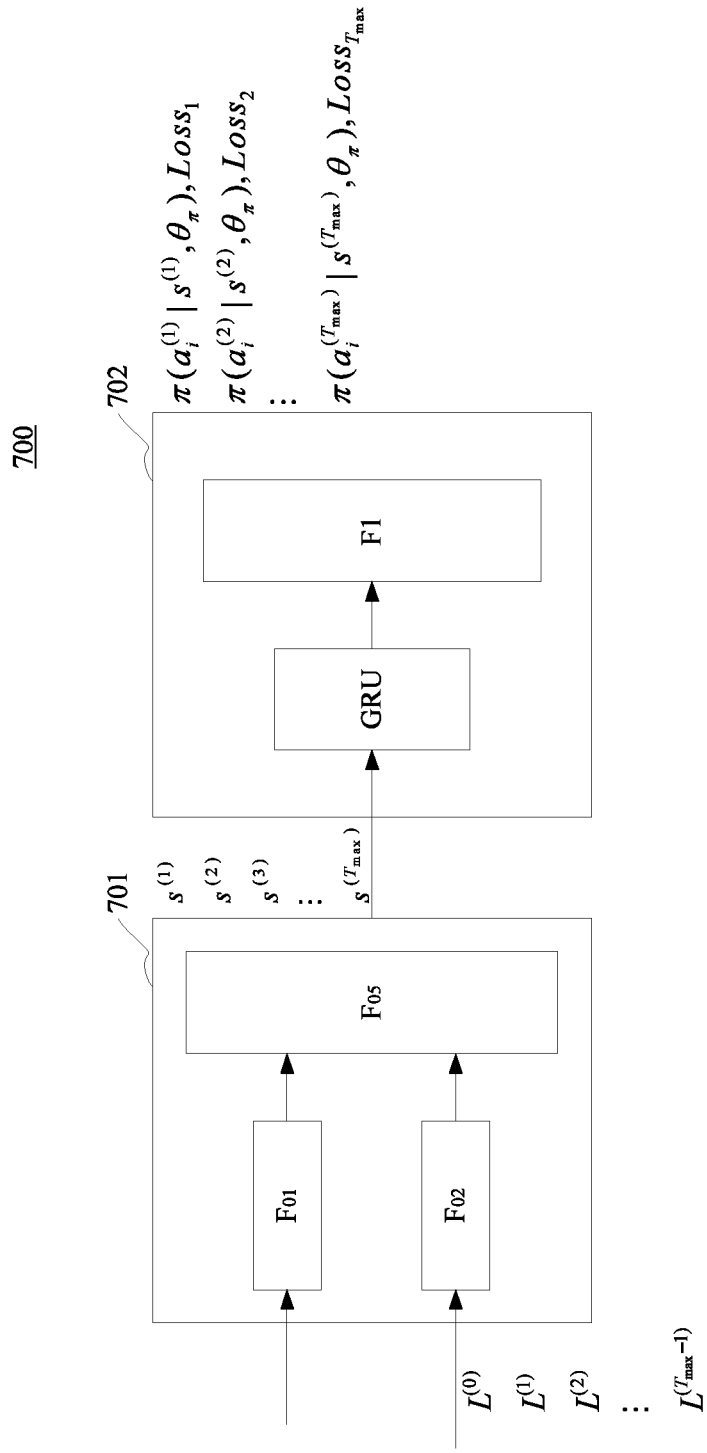
FIG. 7 is a schematic diagram of obtaining an aggregate loss value using an architecture of the policy generating model shown in FIG. 5.

FIG. 7 schematically illustrates a manner of determining the aggregate loss value using a policy generating model of the same structure as that in FIG. 5. These skilled in the art may understand that when the feature indicated by the current state information is different, the descriptive network in the policy generating model also has a different structure (e.g., having a different number of fully-connected layers). Similarly, if the video feature information indicative of the video feature of the training sample video is also introduced into the descriptive network, the descriptive network in the policy generating model will provide a further fully-connected layer (e.g., the fully-connected layer F04 as mentioned above) to fuse the feature information, which is reflected in the finally generated current state (i.e., output of the descriptive network 701).

As shown in FIG. 7, first, an initial position $L^{(0)}$ of a target video clip may be determined from the training sample video, and the feature information of the current video clip of the training sample video as determined based on the initial position and the pre-determined descriptive information of the training sample video are introduced into the descriptive network 701 to thereby obtain the current state $S^{(1)}$.

Next, the current state $S^{(1)}$ is introduced into the policy generating network 702 to thereby obtain a current probabilistic distribution $\pi(a_i^{(1)}|s^{(1)},\theta_\pi)$ under the current policy generating model and the current state $S^{(1)}$ of the training sample video. Specifically, $\theta_\pi$ refers to a model parameter of the current policy generating model.

Next, a loss value $Loss_1$ of the current iterative step is determined using the preset loss function based on the determined current probabilistic distribution $\pi(a_i^{(1)}|s^{(1)},\theta_\pi)$. Here, it may be understood that before executing the iterative step, the loss value of the current iterative step may have an initial value Loss0=0.

Next, a sum of the loss value of the current iterative step and a loss value of a preceding iterative step is used as an updated loss value of the current iterative step, i.e., the updated $Loss_1$ is the sum of the $Loss_1$ before update and the Loss0. Now, updating of the loss value of the current iterative step is completed.

Next, it is determined whether the iterative termination condition is currently reached, e.g., it is preset that the iterative termination condition is executing $T_{max}$ times of the iterative step; if the current execution times does not reach $T_{max}$, the current position is updated to $L^{(1)}$ based on the current probabilistic distribution $\pi(a_i^{(1)}|s^{(1)},\theta_\pi)$, and then the iterative step is re-executed.

In this way, because the current position is updated to $L^{(1)}$, the current state will also be correspondingly updated to $s^{(2)}$, and the finally obtained probabilistic distribution $\pi(a_i^{(2)}|s^{(2)},\theta_\pi)$ is also obtained based on the new current state $s^{(2)}$. Besides, by re-executing the iterative step, the loss value $Loss_2$ of the current iterative step is updated to the sum of the $Loss_2$ before update and $Loss_1$.

By constantly updating the loss value of the current iterative step and the current position, the loss values may be progressively aggregated, and upon reaching the iterative termination condition, the final aggregate loss value is obtained.

As described above, the policy generating model according to this embodiment may be trained through reinforcement training. To comprehensively consider the accuracy degree of the finally grounded target video and the burden of the computational cost, in some optional implementations, a reward $r_t$ for a certain time of executing the iterative step may be set using equation (1) below:

$$r_t = \begin{cases} 1 - \phi \times t & tIoU^{(t)} > tIoU^{(t-1)} \geq 0 \\ -\phi \times t & tIoU^{(t-1)} \geq tIoU \geq 0 \\ -1 - \phi \times t & \text{else} \end{cases} \quad (1)$$

In the equation (1), $\phi$ is a preset penalty factor, satisfying $0<\phi\leq1$. In this way, $-\phi \times t$ is a negative number, and the more number of times t the iterative step is executed, the larger the $-\phi \times t$ becomes.

Besides, in the equation (1), $tIoU^{(t)}$ may be understood as the intersection-over-union of the $i^{th}$ step, and $tIoU^{(t)}$ may be determined through equation (2) below:

$$tIoU^{(t)} = \frac{\min(g_e, l_e^{(t)}) - \max(g_s, l_s^{(t)})}{\max(g_e, l_e^{(t)}) - \min(g_s, l_s^{(t)})} \quad (2)$$

where $L^{(t)}=[l_s^{(t)}, l_e^{(t)}]$ denotes a time range, in the training sample video, of the current video clip grounded after executing the $t^{th}$ time of iterative step (i.e., the $t^{th}$ step) on the training sample video; correspondingly, $l_s^{(t)}$ denotes the start point of the current video clip in the training sample video after the $t^{th}$ step, while $l_e^{(t)}$ denotes the end point of the current video clip after the $t^{th}$ step. $G=[g_s,g_e]$ denotes the time range, in the training sample video, of the pre-labeled target video clip in the training sample video. Correspondingly, $g_s$ denotes the start point of the pre-labeled target video clip in the training sample video, while $g_e$ denotes the end point of the pre-labeled target video clip in the training sample video.

It may be understood that the grounding process is modeled as a sequential decision making problem, an ultimate goal of which is to let $L^{(t)}=G$. Therefore, the reward in the subsequent step should be traced back to the current step. At this point, the aggregate reward $R_t$ may be determined through equation (3) below:

$$R_t = \begin{cases} r_t & t = T_{max} \\ \gamma R_{t+1} + r_t & t = 1, 2, \ldots, T_{max} - 1 \end{cases} \quad (3)$$

Here, $\gamma$ denotes a preset attenuation coefficient, satisfying $0 \leq \gamma \leq 1$, and $T_{max}$ denotes a preset maximum number of times of executing the iterative step shown in FIG. 6 on the training sample video.

As discussed above, to maximize the aggregate reward $R_t$, the aggregate loss function may include a first component determined based on the preset cumulative reward function $R_t$. Specifically, the first component for example may be set using equation (4) below:

$$L'_A(\theta_\pi) = -\sum_t (\log \pi(a_i^{(t)} \mid s^{(t)}, \theta_\pi)) R_t \quad (4)$$

In equation (4), $\pi(a_i^t \mid s^{(t)}, \theta_\pi)$ denotes a current probabilistic distribution determined under the current policy generating model and the current state of the training sample video after each time of executing the iterative step 601 as shown in FIG. 6. Moreover, the current probabilistic distribution refers to a probabilistic distribution of the probabilities of respective action policies $a_i^{(t)}$ in the action policy set $\mathcal{A}$. being sampled.

In this way, when training the initial policy generating model using the aggregate loss value obtained based on the preset loss function, parameters ($\theta_\pi$) of the gated recurrent unit, the first fully-connected layer, and the fully-connected unit in the policy generating network shown in FIG. 5 may be adjusted based on backpropagation of the aggregate loss value determined from the first component. Specifically, for example, $L'_A(\theta_\pi)$ may be minimized through a Stochastic gradient descent algorithm, thereby obtaining $\theta_\pi$ corresponding to the minimized $L'_A(\theta_\pi)$.

Figure 8:
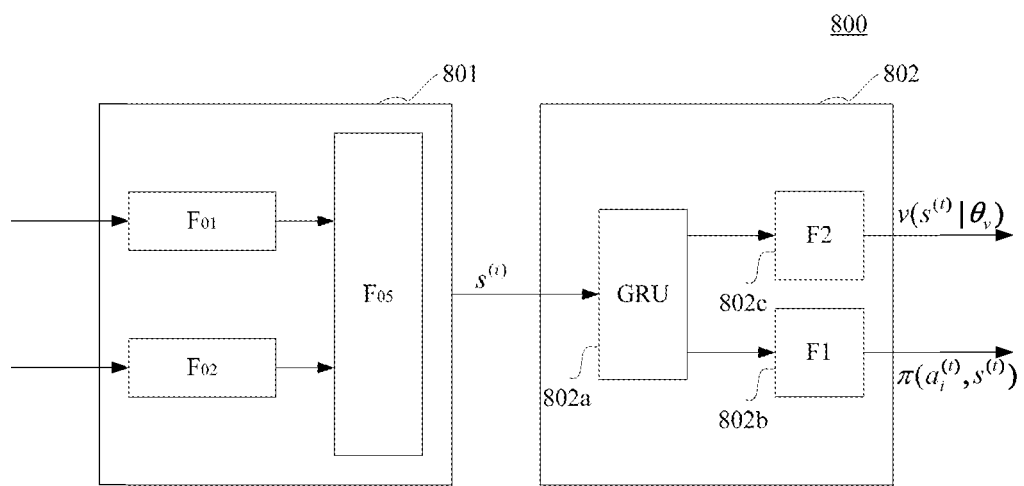
FIG. 8 is another schematic structural diagram of a policy generating model that may be applied to the embodiment of FIG. 4.

In some optional implementations, the method for grounding a target video clip in a video in this embodiment may further adopt a policy generating model 800 as shown in FIG. 8.

Similar to the policy generating model 800 as shown in FIG. 5, the policy generating model shown in FIG. 8 may likewise include a descriptive network 801 and a policy generating network 802. Moreover, the descriptive network 801 may adopt a structure similar to that of the descriptive network 501 in FIG. 5.

Besides, in the policy generating model shown in FIG. 8, the policy generating network may likewise include a gated recurrent unit 802a and a first fully-connected layer 802b. Optionally, the policy generating model shown in FIG. 8 may also include classifier connected to the output of the first fully-connected layer 802b (not shown in the figure).

Different from the policy generating model shown in FIG. 5, the policy generating network 802 in the policy generating model shown in FIG. 8 further include a second fully-connected layer 802c.

The second fully-connected layer 802c is configured for generating a predicted reward value $v(s^{(t)} \mid \theta_v)$ corresponding to the current state information based on the hidden state, where $\theta_v$ denotes a model parameter of the second fully-connected layer 802c.

Based on the structure of the policy generating network shown in FIG. 8, to maximize the aggregate reward $R_t$ and let the predicted reward value approach to a ground-truth aggregate reward $R_t$ as close as possible, the loss function may not only include a first component of the loss function set according to equation (5) below, but also may include a second component, as expressed in equation (6) below, for characterizing an offset between the predicted reward value and the ground-truth reward value determined based on a reward function:

$$L'_A(\theta_\pi) = -\sum_t (\log \pi(a_i^{(t)} \mid s^{(t)}, \theta_\pi))(R_t - v(s^{(t)} \mid \theta_v)) \quad (5)$$

$$L_c(\theta_v) = \sum_t (v(s^{(t)} \mid \theta_v - R_t)^2 \quad (6)$$

Correspondingly, when training the initial policy generating model using the aggregate loss value obtained based on the preset loss function to thereby obtain the trained policy generating model, parameters ($\theta_\pi$) of the gated recurrent unit, the first fully-connected layer, and the fully-connected unit, and the parameter ($\theta_v$) of the second fully-connected layer may be adjusted based on backpropagation of the aggregate loss value determined from the first component, and parameters ($\theta_v$) of the gated recurrent unit, the second fully-connected layer, and the fully-connected unit may also be adjusted based on the backpropagation of the aggregate loss value determined from the second component.

Besides, in some application scenarios of adopting the policy generating model shown in FIG. 8, to increase the diversity of the action policies determined from the action policy set based on the probabilistic distribution $\pi(a_i^t \mid s^{(t)}, \theta_\pi)$, the loss function may further adopt a third component, as determined using an equation (7) below, for characterizing an entropy of the probabilistic distribution outputted by the first fully-connected layer:

$$L''_A(\theta_\pi) = -\sum_t H(\pi(a_i^{(t)} \mid s^{(t)}, \theta_\pi)) \quad (7)$$

In these application scenarios, when training the initial policy generating model using the aggregate loss value obtained based on the preset loss function to thereby obtain a trained policy generating model, parameters of the gated recurrent unit, the first fully-connected layer, and the fully-connected unit may be adjusted based on backpropagation of the aggregate loss value determined from the third component.

It may be understood that in actual applications, the loss function shown in equation (8) below may be further obtained based on a weighted sum of the loss functions determined from the equations (5)~(7), and the policy generating model is trained using the aggregate loss value determined using the loss function shown in the equation (8):

$$L_1 = -\sum_t (\log \pi(a_i^{(t)} | s^{(t)}, \theta_\pi))(R_t - v(s^{(t)} | \theta_v)) - \sum_t \lambda_0 \times H(\pi(a_i^{(t)} | s^{(t)}, \theta_\pi)) + \lambda_1 \times \sum_t (v(s^{(t)} | \theta_v - R_t)^2 \quad (8)$$

where $\lambda_0$ and $\lambda_1$ are both preset coefficients.

Figure 9:
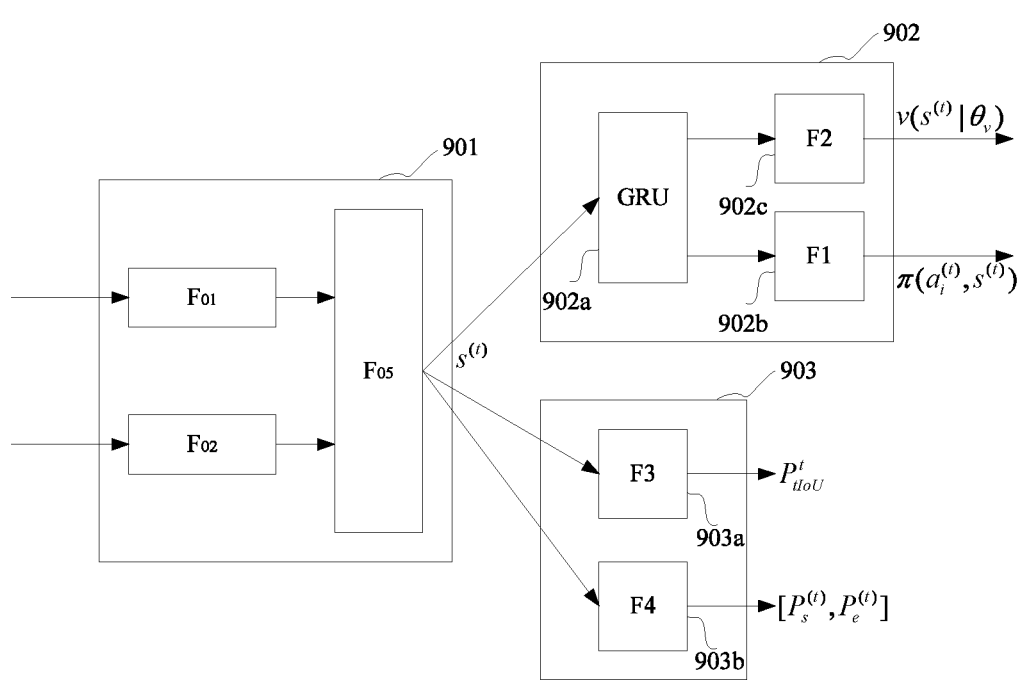
FIG. 9 is a further schematic structural diagram of a policy generating model that may be applied to the embodiment of FIG. 4.

In some optional implementations, the method for grounding a target video clip in a video in this embodiment may further adopt a policy generating model 900 as shown in FIG. 9.

As shown in FIG. 9, the policy generating model may likewise include a descriptive network 901 and a policy generating network 902. Moreover, the descriptive network 901 may adopt a structure similar to that of the descriptive network 501 in FIG. 5 and that of the descriptive network 801 in FIG. 8. Similarly, the policy generating network 902 may have a structure similar to that of the policy generating network 502 shown in FIG. 5. In other words, the policy generating model 902 may only include a gated recurrent unit 902*a* and a first fully-connected layer 902*b*. Or, the policy generating network 902 may have a structure similar to that of the policy generating network 802 shown in FIG. 8. In other words, the policy generating model 902 may include a gated recurrent unit 902*a*, a first fully-connected layer 902*b*, and a second fully-connected layer 902*c*. Optionally, the policy generating model shown in FIG. 9 may also include classifier connected to the output of the first fully-connected layer 902*b* (not shown in the figure).

Different from the policy generating models shown in FIG. 5 and FIG. 8, the policy generating model 902 shown in FIG. 9 further includes a position regression network 903. Moreover, as shown in FIG. 9, the position regression network 903 may include a third fully-connected layer 903*a* and a fourth fully-connected layer 903*b* which are connected to the descriptive network 901.

Based on the structure of the policy generating model shown in FIG. 9, when determining the aggregate loss value using the flow shown in FIG. 6, the iterative step may further comprise:

introducing the current state $s^{(t)}$ of the training sample video into the third fully-connected layer 903*a* to thereby obtain a predicted intersection-over-union of the training sample video; and introducing the current state $s^{(t)}$ of the training sample video into the fourth fully-connected layer to thereby obtain a predicted position of the target video clip in the training sample video.

The loss function further includes a fourth component and a fifth component, wherein the fourth component is configured for characterizing an offset between the predicted intersection-over-union of the training sample video outputted by the third fully-connected layer at the current iterative step and the predicted intersection-over-union of the training sample video outputted from executing the preceding iterative step, and the fifth component is configured for characterizing an offset between a predicted position, in the training sample video, of the target video clip in the training sample video outputted by the fourth fully-connected layer and a ground-truth position of the target video clip labeled in the training sample video.

For example, the fourth component of the loss function may be determined through equation (9) below:

$$Loss_{tIoU} = \sum_t | tIoU^{(t-1)} - P_{tIoU}^t | \quad (9)$$

The fifth component of the loss function may be determined through equation (10) below:

$$Loss_{Loc} = \sum_t (|g_s - P_s^{(t)}| + |g_e - P_e^{(t)}|)/2 \quad (10)$$

In the equation (9), $P_{tIoU}^t$ denotes the predicted intersection-over-union outputted by the third fully-connected layer 903*a* in this iterative step, while $tIoU^{(t-1)}$ denotes the intersection-over-union of the training sample video outputted by the preceding iterative step. Here, $tIoU^{(t-1)}$, for example, may be determined using the equation (2).

Correspondingly, training an initial policy generating model using an aggregate loss value obtained based on a preset loss function to thereby obtain a trained policy generating model further comprises:

adjusting parameters of the fully-connected unit, the third fully-connected layer, and the fourth fully-connected layer based on backpropagation of the aggregate loss value determined from the fourth component and the fifth component of the loss function.

It may be understood that in actual applications, the loss function shown in equation (11) below may be further obtained based on a weighted sum of the loss functions determined from the equations (9)~(10), and the parameters of the fully-connected unit, the third fully-connected layer, and the fourth fully-connected layer are adjusted based on the aggregate loss value determined using the loss function of equation (8):

$$L_2 = Loss_{tIoU} + \lambda_2 \times Loss_{Loc}$$

Where $\lambda_2$ denotes a preset coefficient.

In addition, it may be understood that in training the policy generating model shown in FIG. 9, the loss function may include not only the components shown in Equation (11) to adjust the parameters of the full connection unit, the third and fourth fully-connected layers, but also the components shown in Equation (4) or (5) to adjust the parameters of the gated recurrent unit, the first fully-connected layer and the fully-connected unit. Further, the loss function may include components as shown in equation (6) to adjust the parameters of the gated recurrent unit, the second fully-connected layer and the fully-connected unit. Furthermore, the loss function can also include components as shown in equation (7) to adjust the parameters of the gated recurrent unit, the first fully-connected layer and the fully-connected unit.

That is to say, in some optional implementations, in training the policy generating model shown in FIG. 9, the loss function can be determined ultimately based on the weighted sum of L1 shown by equation (8) and L2 shown by equation (11).

Figure 10:
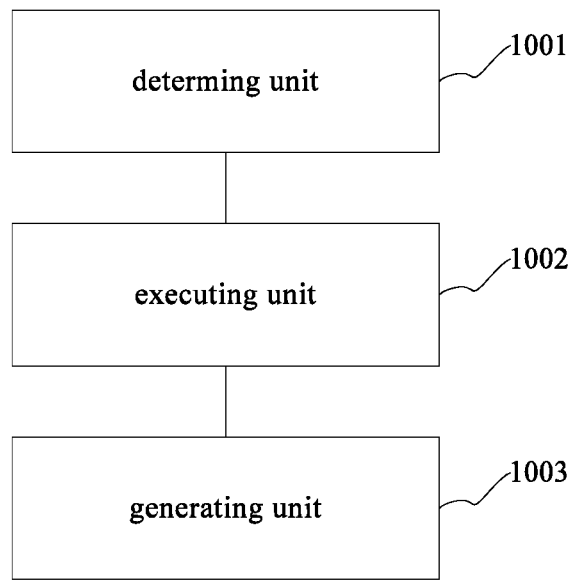
FIG. 10 is a structural diagram of an embodiment of an apparatus for grounding a target video clip in a video according to the present disclosure.

Further refer to FIG. 10. To implement the methods shown in respective drawings above, the present disclosure provides an embodiment of an apparatus for grounding a target video clip in a video. The apparatus embodiment corresponds to the method embodiment shown in FIG. 2. The apparatus may be specifically applied to various electronic devices.

As shown in FIG. 10, the apparatus for grounding a target video clip in a video according to this embodiment comprises a determining unit 1001, an executing unit 1002, and a generating unit 1003.

The determining unit 1001 may be configured for determining a current video clip in the video based on a current position.

The executing unit 1002 may be configured for acquiring descriptive information indicative of a pre-generated target video clip descriptive feature, and executing a target video clip determining step which includes: determining current state information of the current video clip, wherein the current state information includes information indicative of a feature of the current video clip; generating a current action policy based on the descriptive information and the current state information, the current action policy being indicative of a position change of the current video clip in the video.

The generating unit 1003 may be configured for in response to reaching a preset condition, using a video clip resulting from executing the current action policy on the current video clip as the target video clip.

In some optional implementations, the generating unit 1003 may be further configured for: in response to failing to reach a preset condition, using a video clip resulting from executing the current action policy on the current video clip as an updated current target video clip, and re-executing the target video clip determining step.

In some embodiments, the executing unit 1002 is further configured for: introducing the descriptive information and the current state information into a pre-trained policy generating model to thereby obtain a probabilistic distribution of executing respective action policies in a pre-generated action policy set on the current video clip; and determining the current action policy from the action policy set based on the obtained probabilistic distribution.

In some optional implementations, the policy generating model includes a descriptive network and a policy generating network; the descriptive network includes a fully-connected unit having a plurality of fully-connected layers, the fully-connected unit being configured for generating a current state based on the pre-acquired target video clip descriptive feature and the current state information; the policy generating network includes a gated recurrent unit and a first fully-connected layer, the gated recurrent unit being configured for generating a hidden state based on the current state, the first fully-connected layer being configured for generating the probabilistic distribution based on the hidden state.

In some optional implementations, the apparatus for grounding a target video clip in a video in this embodiment may further comprise an acquiring unit (not shown). The acquiring unit may be configured for: before the executing unit executes the target video clip determining step, acquiring video feature information indicative of a video feature of the video; and the descriptive network is further configured for generating the current state based on the video feature information.

In some optional implementations, the current state information may further include information indicative of a relative position feature of the current video clip in the video.

In some optional implementations, the apparatus for grounding a target video clip in a video in this embodiment may further comprise a training unit (not shown). The training unit is configured for training an initial policy generating model using an aggregate loss value obtained based on a preset loss function to thereby obtain a trained policy generating model; the aggregate loss value is determined through a determining step which includes: introducing, into the current policy generating model, the training sample video and a current video clip of the training sample video that is determined based on the current position information of the target video clip of the training sample video, and executing an iterative step which includes: determining a current state of the training sample video based on a descriptive network of the current policy generating model; introducing the current state of the determined training sample video into the policy generating network of the current policy generating model to thereby obtain a current probabilistic distribution under the current policy generating model and the current state of the training sample video; determining a loss value of the current iterative step using the preset loss function based on the determined current probabilistic distribution; using a sum of the loss value of the current iterative step and a loss value of a preceding iterative step as an updated loss value of the current iterative step; and the determining step further comprises: in response to failing to reach an iteration termination condition, updating the current position based on the current probabilistic distribution and re-executing the iterative step; in response to reaching the iteration termination condition, using the loss value of the updated current iterative step obtained from the last time of executing the iterative step as the aggregate loss value.

In some optional implementations, the loss function may comprise a first component determined based on a preset cumulative reward function; the training unit is further configured for: adjusting parameters of the gated recurrent unit, the first fully-connected layer, and the fully-connected unit based on backpropagation of the aggregate loss value determined from the first component.

In some optional implementations, the policy generating network may further include a second fully-connected layer; the second fully-connected layer is configured for generating a predicted reward value corresponding to the current state information based on the hidden state; the loss function further includes a second component for characterizing an offset between the predicted reward value and a ground-truth reward value determined based on the reward function.

In these optional implementations, the training unit may be further configured for: adjusting parameters of the second fully-connected layer based on backpropagation of the aggregate loss value determined from the first component; and adjusting parameters of the gated recurrent unit, the second fully-connected layer, and the fully-connected unit based on backpropagation of the aggregate loss value determined from the second component.

In some optional implementations, the loss function may further include a third component for characterizing an entropy of a probabilistic distribution outputted by the first fully-connected layer; the training unit is further configured for: adjusting parameters of the gated recurrent unit, the first fully-connected layer, and the fully-connected unit based on backpropagation of the aggregate loss value determined from the third component.

In some optional implementations, the policy generating model may further comprise a position regression network; the position regression network includes a third fully-connected layer and a fourth fully-connected layer which are connected to the descriptive network.

In these optional implementations, the training unit, after determining a current state of the training sample video based on a descriptive network of the current policy generating model, may be further configured for: introducing the current state of the training sample video into the third fully-connected layer to thereby obtain a predicted intersection-over-union; and introducing the current state of the training sample video into the fourth fully-connected layer to thereby obtain a predicted position of the target video clip in the training sample video; the loss function further includes a fourth component and a fifth component, wherein the fourth component is configured for characterizing an offset between the predicted intersection-over-union of the training sample video outputted by the third fully-connected layer at the current iterative step and the predicted intersection-over-union of the training sample video outputted from executing the preceding iterative step, and the fifth component is configured for characterizing an offset between a predicted position, in the training sample video, of the target video clip in the training sample video outputted by the fourth fully-connected layer and a ground-truth position of the target video clip labeled in the training sample video; the training unit is further configured for: adjusting parameters of the fully-connected unit, the third fully-connected layer, and the fourth fully-connected layer based on backpropagation of the aggregate loss value determined from the fourth component and the fifth component of the loss function.

Figure 11:
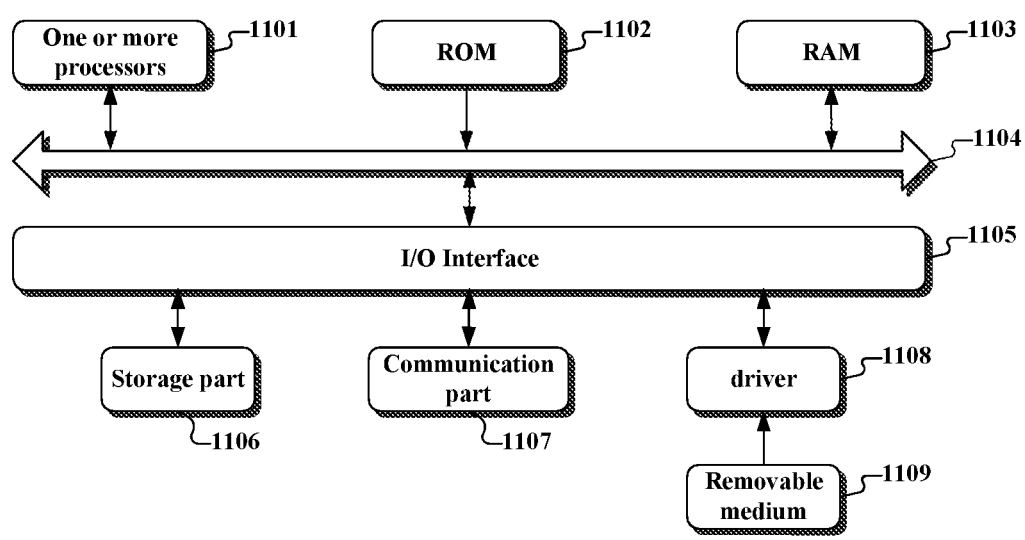
FIG. 11 is a structural schematic diagram of a computer system of an electronic device adapted for implementing a method for grounding a target video clip in a video according to the embodiments of the present disclosure.

Now refer to FIG. 11, which shows a structural schematic diagram of a computer system 1100 of an electronic device adapted for implementing a method for grounding a target video clip in a video according to the embodiments of the present disclosure. The electronic device shown in FIG. 11 is only an example, which should not constitute any limitation to the function and use scope of the embodiments of the present disclosure.

As shown in FIG. 11, the computer system 1100 comprises a processing unit (e.g., CPU) 1101 which may perform various kinds of appropriate actions and processing according to computer program instructions stored in a read-only memory (ROM) 1102 or a program loaded into the random-access memory (RAM) 1103 from a memory part 1106. In RAM 1103, there may also store various kinds of programs and data needed for operations of the system 1100. CPU 1101, ROM 1102, and RAM 1103 are connected with each other via a bus 1104 The input/output (I/O) interface 1105 may also be connected to the bus 1104.

The following components are connected to the I/O interface 1105, including: a memory part 1106 including a hard disk, etc.; and a communication part 1107 including a network interface card such as a LAN (Local Area Network) card, a modem, etc. The communication part 1107 performs communication processing via a network such as the Internet. The driver 1108 is also connected to the I/O interface 1105 as needed. A removable medium 1109, such as a magnetic disk, an optical disk, a magneto-optical disk, and a semiconductor memory, etc., is mounted on the driver 1108 as needed, so as to facilitate the computer program read therefrom to be installed in the memory part 1106.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing computer codes for executing the method shown in the flow chart. In such an embodiment, the computer programs may be downloaded and installed from a network through the communication part 1107, and/or installed from a removable medium 1109. When being executed by the central processing unit (CPU) 1101, the computer programs execute the functions limited in the method of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program codes are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device. The program codes embodied on the computer-readable medium may be transmitted using any appropriate medium, including, but not limited to: wireless, wired, cable, RF, etc., or any appropriate combination thereof.

Computer readable program instructions for carrying out operations of the present invention may be compiled in one or more programming languages, the programming languages including object-oriented programming languages such as Java, Smalltalk, C++ or the like, as well as conventional procedural programming languages, such as the "C" programming language or similar programming languages. The computer codes may be executed entirely on the user's computer, partially on the user's computer, executed as a stand-alone software package, and partially on the user's computer and partially executed on a remote computer, or entirely executed on the remote computer or server. In a scenario involving a remote computer, the remote computer may be connected to the user's computer through any type of network, including a local area network (LAN) or a wide area network (WAN), or the connection may be made to an external computer (for example, through the Internet using an Internet Service Provider).

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks may be actually executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the embodiments of the present disclosure may be implemented by software or by hardware. The units as described may also be provided in a processor. For example, they may be described as: a processor comprising a determining unit, an executing unit and a generating unit. Particularly, names of these units do not constitute a limitation to the units per se in some circumstances. For example, the determining unit may also be described as "a unit for determining a current video clip in the video based on a current position."

As another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: determine a current video clip in the video based on a current position; acquire descriptive information indicative of a pre-generated target video clip descriptive feature, and execute a target video clip determining step which includes: determining current state information of the current video clip, wherein the current state information includes information indicative of a feature of the current video clip; generating a current action policy based on the descriptive information and the current state information, the current action policy being indicative of a position change of the current video clip in the video; the method further comprising: in response to reaching a preset condition, using a video clip resulting from executing the current action policy on the current video clip as the target video clip.

What have been described above are only preferred embodiments of the present disclosure and an illustration of the technical principle as exploited. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for grounding a target video clip in a video, comprising:
   determining a current video clip in the video based on a current position;
   acquiring descriptive information indicative of a pre-generated target video clip descriptive feature, and executing a target video clip determining step which includes:
   determining current state information of the current video clip, wherein the current state information includes information indicative of a feature of the current video clip;
   generating a current action policy based on the descriptive information and the current state information, the current action policy being indicative of a position change of the current video clip in the video; and
   the method further comprising:
   in response to reaching a preset condition, using a video clip resulting from executing the current action policy on the current video clip as the target video clip.

2. The method according to claim 1, further comprising:
   in response to failing to reach a preset condition, using a video clip resulting from executing the current action policy on the current video clip as an updated current target video clip, and re-executing the target video clip determining step.

3. The method according to claim 1, wherein generating a current action policy based on the descriptive information and the current state information comprises:
   introducing the descriptive information and the current state information into a pre-trained policy generating model to thereby obtain a probabilistic distribution of executing respective action policies in a pre-generated action policy set on the current video clip; and
   determining the current action policy from the action policy set based on the obtained probabilistic distribution.

4. The method according to claim 3, wherein the policy generating model includes a descriptive network and a policy generating network;
   the descriptive network comprises a fully-connected unit having a plurality of fully-connected layers, the fully-connected unit being configured for generating a current state based on the pre-acquired target video clip descriptive feature and the current state information;
   the policy generating network includes a gated recurrent unit and a first fully-connected layer, the gated recurrent unit being configured for generating a hidden state based on the current state, the first fully-connected layer being configured for generating the probabilistic distribution based on the hidden state.

5. The method according to claim 4, wherein before executing the target video clip determining step, the method further comprises: acquiring video feature information indicative of a video feature of the video; and
   the descriptive network is further configured for generating the current state based on the video feature information.

6. The method according to claim 4, wherein the current state information further includes information indicative of a relative position feature of the current video clip in the video.

7. The method according to claim 1, further comprising:
   training an initial policy generating model using an aggregate loss value obtained based on a preset loss function to thereby obtain a trained policy generating model;
   the aggregate loss value is determined through a determining step which includes:
   introducing, into the current policy generating model, the training sample video and a current video clip of the training sample video that is determined based on the current position information of the target video clip of the training sample video, and executing an iterative step which includes:

determining a current state of the training sample video based on a descriptive network of the current policy generating model; and introducing the current state of the determined training sample video into the policy generating network of the current policy generating model to thereby obtain a current probabilistic distribution under the current policy generating model and the current state of the training sample video;

determining a loss value of the current iterative step using the preset loss function based on the determined current probabilistic distribution;

using a sum of the loss value of the current iterative step and a loss value of a preceding iterative step as an updated loss value of the current iterative step; and the determining step further comprises:
in response to failing to reach an iteration termination condition, updating the current position based on the current probabilistic distribution and re-executing the iterative step; and in response to reaching the iteration terminative condition, using the loss value of the updated current iterative step obtained from the last time of executing the iterative step as the aggregate loss value.

8. The method according to claim 7, wherein the loss function includes a first component determined based on a preset cumulative reward function;
training an initial policy generating model using an aggregate loss value obtained based on a preset loss function to thereby obtain a trained policy generating model comprises:
adjusting parameters of the gated recurrent unit, the first fully-connected layer, and the fully-connected unit based on backpropagation of the aggregate loss value determined from the first component.

9. The method according to claim 8, wherein the policy generating network further includes a second fully-connected layer;
the second fully-connected layer is configured for generating a predicted reward value corresponding to the current state information based on the hidden state;
the loss function further includes a second component for characterizing an offset between the predicted reward value and a ground-truth reward value determined based on the reward function; and
training an initial policy generating model using an aggregate loss value obtained based on a preset loss function to thereby obtain a trained policy generating model further comprises:
adjusting parameters of the second fully-connected layer based on backpropagation of the aggregate loss value determined from the first component; and
adjusting parameters of the gated recurrent unit, the second fully-connected layer, and the fully-connected unit based on backpropagation of the aggregate loss value determined from the second component.

10. The method according to claim 8, wherein the loss function further includes a third component for characterizing an entropy of a probabilistic distribution outputted by the first fully-connected layer;
training an initial policy generating model using an aggregate loss value obtained based on a preset loss function to thereby obtain a trained policy generating model further comprises:

adjusting parameters of the gated recurrent unit, the first fully-connected layer, and the fully-connected unit based on backpropagation of the aggregate loss value determined from the third component.

11. The method according to claim 8, wherein the policy generating model comprises a position regression network;
the position regression network comprises a third fully-connected layer and a fourth fully-connected layer which are connected to the descriptive network;
after determining a current state of the training sample video based on a descriptive network of the current policy generating model, the iterative step further comprises:
introducing the current state of the training sample video into the third fully-connected layer to thereby obtain a predicted intersection-over-union; and
introducing the current state of the training sample video into the fourth fully-connected layer to thereby obtain a predicted position of the target video clip in the training sample video;
the loss function further includes a fourth component and a fifth component, wherein the fourth component is configured for characterizing an offset between the predicted intersection-over-union of the training sample video outputted by the third fully-connected layer at the current iterative step and the predicted intersection-over-union of the training sample video outputted from executing the preceding iterative step, and the fifth component is configured for characterizing an offset between a predicted position, in the training sample video, of the target video clip in the training sample video outputted by the fourth fully-connected layer and a ground-truth position of the target video clip labeled in the training sample video; and
training an initial policy generating model using an aggregate loss value obtained based on a preset loss function to thereby obtain a trained policy generating model further comprises:
adjusting parameters of the fully-connected unit, the third fully-connected layer, and the fourth fully-connected layer based on backpropagation of the aggregate loss value determined from the fourth component and the fifth component of the loss function.

12. An apparatus for grounding a target video clip in a video, comprising:
at least one processor; and
a memory storing instructions, wherein the instructions when executed by the at least one processor, cause the at least one processor to perform operations, the operations comprising:
determining a current video clip in the video based on a current position;
acquiring descriptive information indicative of a pre-generated target video clip descriptive feature, and executing a target video clip determining step which includes:
determining current state information of the current video clip, wherein the current state information includes information indicative of a feature of the current video clip; and
generating a current action policy based on the descriptive information and the current state information, the current action policy being indicative of a position change of the current video clip in the video;
the operations further comprise:

in response to reaching a preset condition, using a video clip resulting from executing the current action policy on the current video clip as the target video clip.

13. The apparatus according to claim 12, wherein the operations further comprise:
in response to failing to reach a preset condition, using a video clip resulting from executing the current action policy on the current video clip as an updated current target video clip, and re-executing the target video clip determining step.

14. The apparatus according to claim 12, wherein generating a current action policy based on the descriptive information and the current state information comprises:
introducing the descriptive information and the current state information into a pre-trained policy generating model to thereby obtain a probabilistic distribution of executing respective action policies in a pre-generated action policy set on the current video clip; and
determining the current action policy from the action policy set based on the obtained probabilistic distribution.

15. The apparatus according to claim 14, wherein the policy generating model includes a descriptive network and a policy generating network;
the descriptive network comprises a fully-connected unit having a plurality of fully-connected layers, the fully-connected unit being configured for generating a current state based on the pre-acquired target video clip descriptive feature and the current state information;
the policy generating network includes a gated recurrent unit and a first fully-connected layer, the gated recurrent unit being configured for generating a hidden state based on the current state, the first fully-connected layer being configured for generating the probabilistic distribution based on the hidden state.

16. The apparatus according to claim 12,
wherein the operations further comprise: before executing the target video clip determining step, acquiring video feature information indicative of a video feature of the video; and
the descriptive network is further configured for generating the current state based on the video feature information.

17. The apparatus according to claim 15, wherein the current state information further includes information indicative of a relative position feature of the current video clip in the video.

18. The apparatus according to claim 15, wherein the operations further comprise:
training an initial policy generating model using an aggregate loss value obtained based on a preset loss function to thereby obtain a trained policy generating model;
the aggregate loss value is determined through a determining step which includes:
introducing, into the current policy generating model, the training sample video and a current video clip of the training sample video that is determined based on the current position information of the target video clip of the training sample video, and executing an iterative step which includes:

determining a current state of the training sample video based on a descriptive network of the current policy generating model;
introducing the current state of the determined training sample video into the policy generating network of the current policy generating model to thereby obtain a current probabilistic distribution under the current policy generating model and the current state of the training sample video;
determining a loss value of the current iterative step using the preset loss function based on the determined current probabilistic distribution; and
using a sum of the loss value of the current iterative step and a loss value of a preceding iterative step as an updated loss value of the current iterative step; and
the determining step further comprises:
in response to failing to reach an iteration termination condition, updating the current position based on the current probabilistic distribution and re-executing the iterative step;
in response to reaching the iteration terminative condition, using the loss value of the updated current iterative step obtained from the last time of executing the iterative step as the aggregate loss value.

19. The apparatus according to claim 18, wherein the loss function includes a first component determined based on a preset cumulative reward function;
training an initial policy generating model using an aggregate loss value obtained based on a preset loss function to thereby obtain a trained policy generating model comprises:
adjusting parameters of the gated recurrent unit, the first fully-connected layer, and the fully-connected unit based on backpropagation of the aggregate loss value determined from the first component.

20. A non-transitory computer-readable memory medium on which a computer program is stored, wherein the program, when being executed by a processor, causes the processor to perform operations, the operations comprising:
determining a current video clip in the video based on a current position;
acquiring descriptive information indicative of a pre-generated target video clip descriptive feature, and executing a target video clip determining step which includes:
determining current state information of the current video clip, wherein the current state information includes information indicative of a feature of the current video clip; and
generating a current action policy based on the descriptive information and the current state information, the current action policy being indicative of a position change of the current video clip in the video;
the operations further comprise:
in response to reaching a preset condition, using a video clip resulting from executing the current action policy on the current video clip as the target video clip.

* * * * *